United States Patent
Breton et al.

(10) Patent No.: US 11,725,598 B2
(45) Date of Patent: Aug. 15, 2023

(54) METHOD FOR CONTROLLING ENGINE BRAKING IN A VEHICLE

(71) Applicant: BOMBARDIER RECREATIONAL PRODUCTS INC., Valcourt (CA)

(72) Inventors: Remi Breton, Drummondville (CA); Walid Ben Attouch, Sherbrooke (CA); Maxime Dulac, Sherbrooke (CA); Stephane Chaillou, Granby (CA)

(73) Assignee: BOMBARDIER RECREATIONAL PRODUCTS INC., Valcourt (CA)

( * ) Notice: Subject to any disclaimer, the term of this patent is extended or adjusted under 35 U.S.C. 154(b) by 0 days.

(21) Appl. No.: 17/727,298

(22) Filed: Apr. 22, 2022

(65) Prior Publication Data

US 2022/0341366 A1 Oct. 27, 2022

Related U.S. Application Data

(60) Provisional application No. 63/178,592, filed on Apr. 23, 2021.

(51) Int. Cl.
*F02D 41/00* (2006.01)
*F02P 5/15* (2006.01)
(Continued)

(52) U.S. Cl.
CPC ............ *F02D 41/0005* (2013.01); *B62K 5/01* (2013.01); *B62K 21/12* (2013.01); *B62K 23/04* (2013.01);
(Continued)

(58) Field of Classification Search
CPC ................... F02D 11/105; F02D 13/04; F02D 2200/0404; F02D 2200/101; F02D 2200/501; F02D 2200/604; F02D 41/0005; F02D 41/123; F02D 41/40; F02P 5/1502; B60W 2300/36; B60W 2300/362;
(Continued)

(56) References Cited

U.S. PATENT DOCUMENTS

| 4,009,698 A * | 3/1977 | Kato ..................... F02P 5/103 123/406.69 |
| 4,257,363 A * | 3/1981 | Zeller .................. F02D 41/182 123/493 |

(Continued)

FOREIGN PATENT DOCUMENTS

EP 2716533 A1 * 4/2014 ............. B62K 11/14

*Primary Examiner* — John M Zaleskas
(74) *Attorney, Agent, or Firm* — BCF LLP (57) ABSTRACT

A method for controlling engine braking in a vehicle comprises: determining a position of a throttle operator; determining a speed of the vehicle; and determining an engine braking mode selected. In response to the position of the throttle operator being a fully released position and the selected braking mode being a first engine braking mode: controlling an engine and a position of a throttle valve according to the first engine braking mode for applying a first level of engine braking. In response to the position of the throttle operator being the fully released position and the selected braking mode being the second engine braking mode: controlling the engine and the position of the throttle valve according to the second engine braking mode based at least on the speed of the vehicle for applying a second level of engine braking. A vehicle implementing the method is also disclosed.

24 Claims, 7 Drawing Sheets

(51) Int. Cl.
    *F02D 41/40*     (2006.01)
    *B62K 23/04*     (2006.01)
    *B62K 21/12*     (2006.01)
    *B62K 5/01*     (2013.01)
    *F02P 5/04*     (2006.01)
    *F02D 9/02*     (2006.01)

(52) U.S. Cl.
    CPC .............. *F02D 41/40* (2013.01); *F02P 5/045* (2013.01); *F02P 5/1502* (2013.01); *F02P 5/1504* (2013.01); *B60Y 2200/124* (2013.01); *F02D 2009/0242* (2013.01); *F02D 2200/0404* (2013.01); *F02D 2200/101* (2013.01); *F02D 2200/501* (2013.01); *F02D 2200/602* (2013.01)

(58) Field of Classification Search
    CPC . B60W 2710/0605; B60W 2710/0644; B60W 2710/065; B60W 30/18136; B62K 21/12; B62K 23/04
    See application file for complete search history.

(56) References Cited

U.S. PATENT DOCUMENTS

| | | | |
|---|---|---|---|
| 4,537,169 A * | 8/1985 | Tsuge | F02D 9/02 123/493 |
| 6,095,942 A * | 8/2000 | Yamaguchi | F16H 61/66259 477/901 |
| 6,536,408 B1 * | 3/2003 | Warner | B60W 30/18136 303/142 |
| 9,777,656 B1 * | 10/2017 | Bowman | F02D 41/0087 |
| 2003/0015172 A1 * | 1/2003 | Leman | F01L 13/065 701/115 |
| 2007/0144494 A1 * | 6/2007 | Mori | F02D 41/12 123/493 |
| 2008/0022969 A1 * | 1/2008 | Frenz | B60W 10/04 123/347 |
| 2010/0282210 A1 * | 11/2010 | Itagaki | F02D 41/2422 123/399 |
| 2015/0032355 A1 * | 1/2015 | Fujito | F02D 41/023 701/99 |
| 2015/0291171 A1 * | 10/2015 | Kuroki | B60W 30/18136 701/70 |
| 2016/0082970 A1 * | 3/2016 | Jeon | F16H 61/21 477/118 |
| 2018/0015926 A1 * | 1/2018 | Cunningham | B60W 10/06 |
| 2018/0187624 A1 * | 7/2018 | David | F16H 61/66 |
| 2018/0202372 A1 * | 7/2018 | Doyama | F02D 41/0002 |
| 2018/0274456 A1 * | 9/2018 | Gunnarsson | F02D 13/0249 |
| 2018/0361853 A1 * | 12/2018 | Grajkowski | B60K 28/10 |
| 2020/0391732 A1 * | 12/2020 | Kaneta | B62L 3/08 |
| 2020/0407010 A1 * | 12/2020 | Okamatsu | B60T 8/1706 |
| 2021/0316727 A1 * | 10/2021 | Aizawa | B60W 40/105 |

* cited by examiner

METHOD FOR CONTROLLING ENGINE BRAKING IN A VEHICLE

CROSS-REFERENCE

The present application claims priority to U.S. Provisional Patent Application No. 63/178,592, filed Apr. 23, 2021, the entirety of which is incorporated herein by reference.

TECHNOLOGICAL FIELD

The present technology relates to methods for controlling engine braking in a vehicle and to vehicles having a controller for carrying out such methods.

BACKGROUND

In a wheeled vehicle powered by an internal combustion engine, when the driver releases the throttle operator, such as the throttle pedal or the throttle lever, the throttle valve almost completely closes. As a result very little air can be supplied to the engine. When this happens, if the vehicle is in movement and the engine is still connected to the wheels, the wheels want to turn the crankshaft of the engine at a speed corresponding to the speed required to move the vehicle at the current speed of the vehicle. However, because of the position of the throttle valve, a vacuum is created in the engine, and the torque applied on the crankshaft by the wheels needs to work against this vacuum. As a result, the engine slows down the vehicle or, in the case of a vehicle going down a hill, at least reduces the vehicle's acceleration. This is known as engine braking.

One of the main advantages of engine braking is that, by assisting in reducing the speed of the vehicle, it can help reduce wear on the brakes normally used to brake the wheels.

The amount of engine braking being provided is mainly the result of the construction of the engine and its associated components. However, some drivers do not like engine braking or would like to adjust an amount of engine braking being provided based on personal preference or depending on current riding conditions. This can be at least partially achieved by the driver by actuating the throttle operator such that the throttle valve opens slightly, but this is not convenient.

Thus, there is a desire for a method controlling engine braking in a vehicle.

SUMMARY

It is an object of the present technology to ameliorate at least some of the inconveniences present in the prior art.

According to an aspect of the present technology, there is provided a vehicle having an internal combustion engine; at least one ground engaging member, at least one of the at least one ground engaging member being operatively connected to the engine for propelling the vehicle; a throttle body fluidly connected to the engine, the throttle body having a throttle valve for controlling a flow of air to the engine; a throttle valve actuator operatively connected to the throttle valve for changing a position of the throttle valve; an electronic control unit (ECU) communicating with the engine for controlling the engine and with the throttle valve actuator for controlling the position of the throttle valve; a throttle operator; a throttle operator position sensor (TOPS) for sensing a position of the throttle operator and communicating with the ECU for sending a signal indicative of the position of the throttle operator; a vehicle speed sensor communicating with the ECU for sending a signal indicative of a speed of the vehicle to the ECU; an engine braking mode selector communicating with the ECU and for selecting an engine braking mode from a plurality of engine braking modes, the plurality of engine braking modes comprising a first engine braking mode and a second engine braking mode. The ECU has a memory storing computer executable instructions. In response to the instructions being executed, the ECU: determining the position of the throttle operator; determining the speed of the vehicle; and determining the engine braking mode selected from the plurality of engine braking modes. In response to the position of the throttle operator being a fully released position and the selected braking mode being the first engine braking mode: controlling the engine and the position of the throttle valve according to the first engine braking mode for applying a first level of engine braking. In response to the position of the throttle operator being the fully released position and the selected braking mode being the second engine braking mode: controlling the engine and the position of the throttle valve according to the second engine braking mode based at least on the speed of the vehicle for applying a second level of engine braking. For any given speed of the vehicle above a predetermined speed of the vehicle, the first level of engine braking being greater than the second level of engine braking.

According to some embodiments, controlling the engine and the position of the throttle valve according to the first engine braking mode comprises closing the throttle valve and stopping fuel injection.

According to some embodiments, controlling the engine and the position of the throttle valve according to the second engine braking mode comprises moving the throttle valve to a partially open position and injecting fuel.

According to some embodiments, controlling the engine and the position of the throttle valve according to the second engine braking mode further comprises retarding ignition.

According to some embodiments, the plurality of engine braking modes further comprises a third engine braking mode. In response to the instructions being executed, the ECU controls the engine and the position of the throttle valve according to the third engine braking mode based at least on the speed of the vehicle for applying a third level of engine braking in response to the position of the throttle operator being the fully released position and the selected braking mode being the third engine braking mode. For any given speed of the vehicle above the predetermined speed of the vehicle, the second level of engine braking is greater than the third level of engine braking.

According to some embodiments, controlling the engine and the position of the throttle valve according to the second engine braking mode comprises moving the throttle valve to a first partially open position; and controlling the engine and the position of the throttle valve according to the third engine braking mode comprises moving the throttle valve to a second partially open position. For any given speed of the vehicle above the predetermined speed of the vehicle, the throttle valve is equally open or more open in the second partially open position than in the first partially open position.

According to some embodiments, controlling the engine and the position of the throttle valve according to the second engine braking mode comprises injecting a first amount of fuel; and controlling the engine and the position of the throttle valve according to the third engine braking mode comprises injecting a second amount of fuel. For any given speed of the vehicle above the predetermined speed of the vehicle, the second amount of fuel is greater than the first amount of fuel.

According to some embodiments, controlling the engine and the position of the throttle valve according to the second engine braking mode comprises retarding ignition by a first number of degrees; and controlling the engine and the position of the throttle valve according to the third engine braking mode comprises retarding ignition by a second number of degrees. For any given speed of the vehicle above the predetermined speed of the vehicle, the second number of degrees is less than the first number of degrees.

According to some embodiments, in response to the instructions being executed, the ECU: determines an engine speed; and stops controlling the engine and the position of the throttle valve according to the engine braking mode selected from the plurality of engine braking modes in response to the engine speed being an idle speed of the engine.

According to some embodiments, in response to the instructions being executed, the ECU: stops controlling the engine and the position of the throttle valve according to the engine braking mode selected from the plurality of engine braking modes in response to the position of the throttle operator being a position other than the fully released position.

According to some embodiments, a continuously variable transmission operatively connects the engine to the at least one of the at least one ground engaging member.

According to some embodiments, a steering device is operatively connected to at least one of the at least one ground engaging member for steering the vehicle; and the engine braking mode selector is mounted to the steering device.

According to some embodiments, the steering device is a handlebar.

According to some embodiments, the throttle operator is mounted to the handlebar; and the engine braking mode selector is in proximity to the throttle operator.

According to some embodiments, the throttle operator is one of: a throttle lever; and a twist grip.

According to some embodiments, the at least one ground engaging member is at least one wheel.

According to some embodiments, the at least one wheel is four wheels; and the engine is operatively connected to the four wheels for propelling the vehicle.

According to another aspect of the present technology, there is provided a method for controlling engine braking in a vehicle. The method comprises: determining a position of a throttle operator of the vehicle; determining a speed of the vehicle; and determining an engine braking mode selected from a plurality of engine braking modes, the plurality of engine braking modes comprising a first engine braking mode and a second engine braking mode. In response to the position of the throttle operator being a fully released position and the selected braking mode being the first engine braking mode: controlling the engine of the vehicle and a position of a throttle valve of the vehicle according to the first engine braking mode for applying a first level of engine braking. In response to the position of the throttle operator being the fully released position and the selected braking mode being the second engine braking mode: controlling the engine and the position of the throttle valve according to the second engine braking mode based at least on the speed of the vehicle for applying a second level of engine braking. For any given speed of the vehicle above a predetermined speed of the vehicle, the first level of engine braking being greater than the second level of engine braking.

According to some embodiments, controlling the engine and the position of the throttle valve according to the first engine braking mode comprises closing the throttle valve and stopping fuel injection.

According to some embodiments, controlling the engine and the position of the throttle valve according to the second engine braking mode comprises moving the throttle valve to a partially open position and injecting fuel.

For purposes of the present application, terms related to spatial orientation when referring to a vehicle and components in relation to the vehicle, such as "forwardly", "rearwardly", "left", "right", "above" and "below", are as they would be understood by a driver of the vehicle sitting thereon in an upright driving position, with the vehicle steered straight-ahead.

Embodiments of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects, and advantages of embodiments of the present technology will become apparent from the following description, the accompanying drawings, and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

The present technology will be described with reference to a four-wheeled straddle-seat all-terrain vehicle (ATV) 10. However, it is contemplated that aspects of the present technology could be used in other types of wheeled vehicles, such as side-by-side vehicles of road vehicles, motorcycles, dune buggies, and the like and other types of land vehicles, such as a snowmobile for example.

Figure 1:
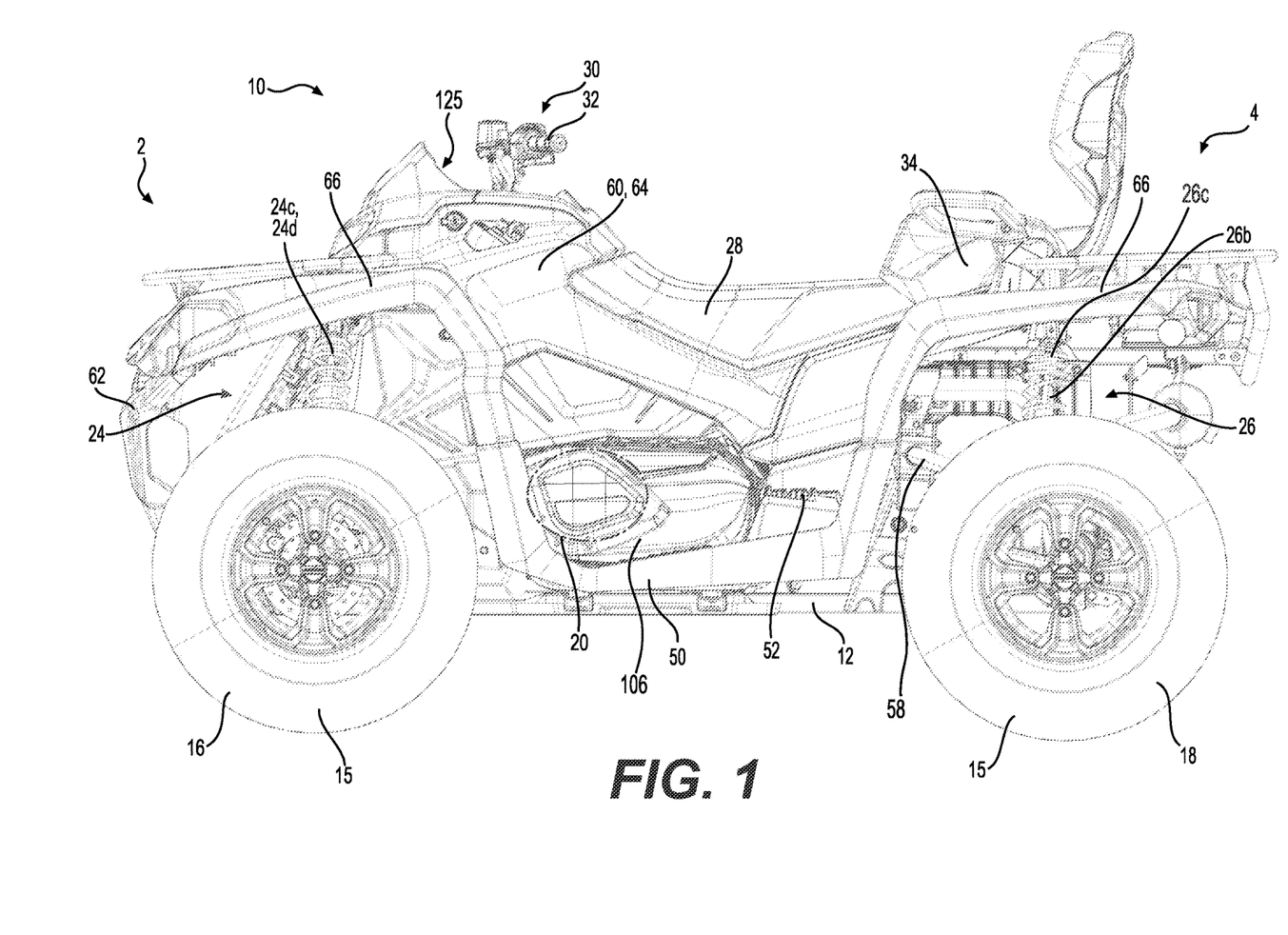
FIG. 1 is a left side elevation view of an all-terrain vehicle (ATV)

With reference to FIG. 1, the ATV 10 has a front end 2 and a rear end 4 defined consistently with a forward travel direction of the ATV 10. The ATV 10 has a frame 12 to which a vehicle body is mounted. A pair of front wheels 16 is suspended from the front portion of the frame 12 via front suspensions 24. A pair of rear wheels 18 is suspended from the rear portion of the frame 12 via rear suspensions 26. Each of the wheels 16, 18 has a tire 15 adapted for off-road conditions and traversing rugged terrain.

As illustrated in FIG. 1, the ATV 10 also includes fairings 60 including a front fascia 62 at the front end 2 of the ATV 10 and several side panels 64 extending over lateral sides of the ATV 10. A fender 66 is disposed over each wheel 16, 18 to protect the driver and/or passenger from dirt, water and other debris being projected by the rotating wheels 16, 18. The ATV 10 further includes a straddle-type driver seat 28 mounted to the frame 12 for accommodating a driver of the ATV 10. Driver footrests 50 are provided on either side of the driver seat 28 and are disposed vertically lower than the driver seat 28 to support the driver's feet. Another straddle-type passenger seat 34 is provided behind the driver seat 28 to accommodate a passenger. A passenger footrest 52 is provided longitudinally rearward of each of the left and right driver footrests 50. The passenger footrests 52 are disposed slightly higher than the driver footrests 50 and designed to accommodate the feet of a passenger seated on the passenger seat 34 which is disposed slightly vertically higher than the driver seat 28. It is contemplated that the passenger seat 34 and the passenger footrests 52 could be omitted.

Each front suspension assembly 24 includes upper and lower A-arms (not shown), a front shock absorber 24c and a front coil spring 24d. The front coil spring 24d is mounted over the front shock absorber 24c. The front coil spring 24d and the front shock absorber 24c are both pivotally connected at their lower ends to the upper A-arm and at their upper ends to the frame 12. The proximal ends of the upper and lower A-arms are pivotably connected to the frame 12. For each front suspension assembly 24, a kingpin (not shown) is mounted between the ends of the upper and lower A-arms. Each front wheel 18 is supported in part by its corresponding kingpin.

Each rear suspension assembly 26 comprises a swing arm (not shown), a rear shock absorber 26b and a rear coil spring 26c. Each swing arm has a front end pivotably connected to the frame 12 and a rear end supporting a wheel shaft (not shown) of its corresponding rear wheel 18. Each swing arm 26a is connected at mid-length to a torsion bar 58. For each rear suspension assembly 26, the rear shock absorber 26b and the rear coil spring 26c each have an upper end pivotally connected to the frame 12 and a lower end pivotally connected to its corresponding swing arm.

A steering assembly 30 is rotationally supported by the frame 12 to enable a driver to steer the ATV 10. The steering assembly 30 includes a handlebar assembly including a handlebar 32 connected to a steering column (not shown) for actuating steering linkages (not shown) operatively connected to left and right front wheels 16. It is contemplated that the steering assembly 30 could include a power steering assembly. It is contemplated that a steering device other than a handlebar could be provided, such as, but no limited to, a steering wheel.

Figure 4:
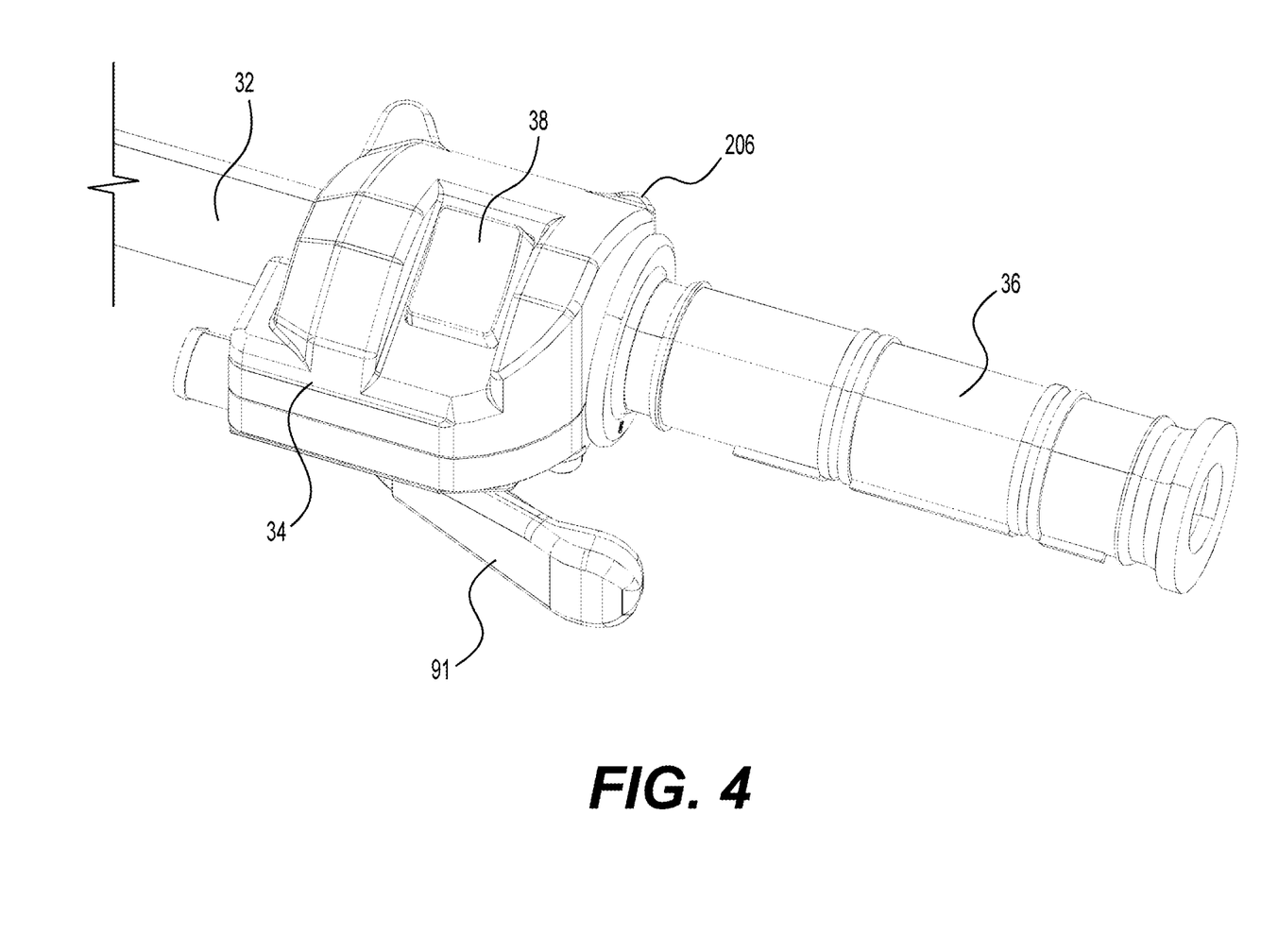
FIG. 4 is a perspective view taken from a rear, right side of a throttle operator, a switch assembly and right handle of the vehicle of FIG. 1.

As shown in FIG. 4, a throttle operator in the form of a thumb-actuated throttle lever 91 is provided near the right end of the handlebar 32. The throttle operator 91 is selectively actuated by the driver of the ATV 10 to request throttle from the engine 20. The throttle lever 91 is pivotally connected to a switch housing 34 mounted near the right end of the handlebar 32. A hand grip 36 is provided next to the switch housing 34. A two-wheel drive/four-wheel drive (2 WD/4 WD) selector switch 38 is provided on the switch housing 34. The 2 WD/4 WD selector switch 38 allows the user to select whether the engine 20 drives only the two rear wheels 18 (i.e. two-wheel drive) or all four wheels 16, 18 (i.e. four-wheel drive) as will be described below. In the present embodiment, the 2 WD/4 WD selector switch 38 is a toggle switch, but it is contemplated that it could be another type of switch. An engine braking mode selector 206 is mounted to a front of the switch housing 34, and is therefore connected to the handlebar 32. The engine braking mode selector 206 is in proximity to the throttle lever 91, meaning that the driver of the vehicle 10 can actuate the throttle lever 91 and then the engine braking mode selector 206 without having to change the position of his/her hand on the hand grip 36. The engine braking mode selector 206 is a button. By pressing the button 206, the driver of the vehicle 10 can cycle through the various engine braking modes as will be described in more detail below.

Figure 5:
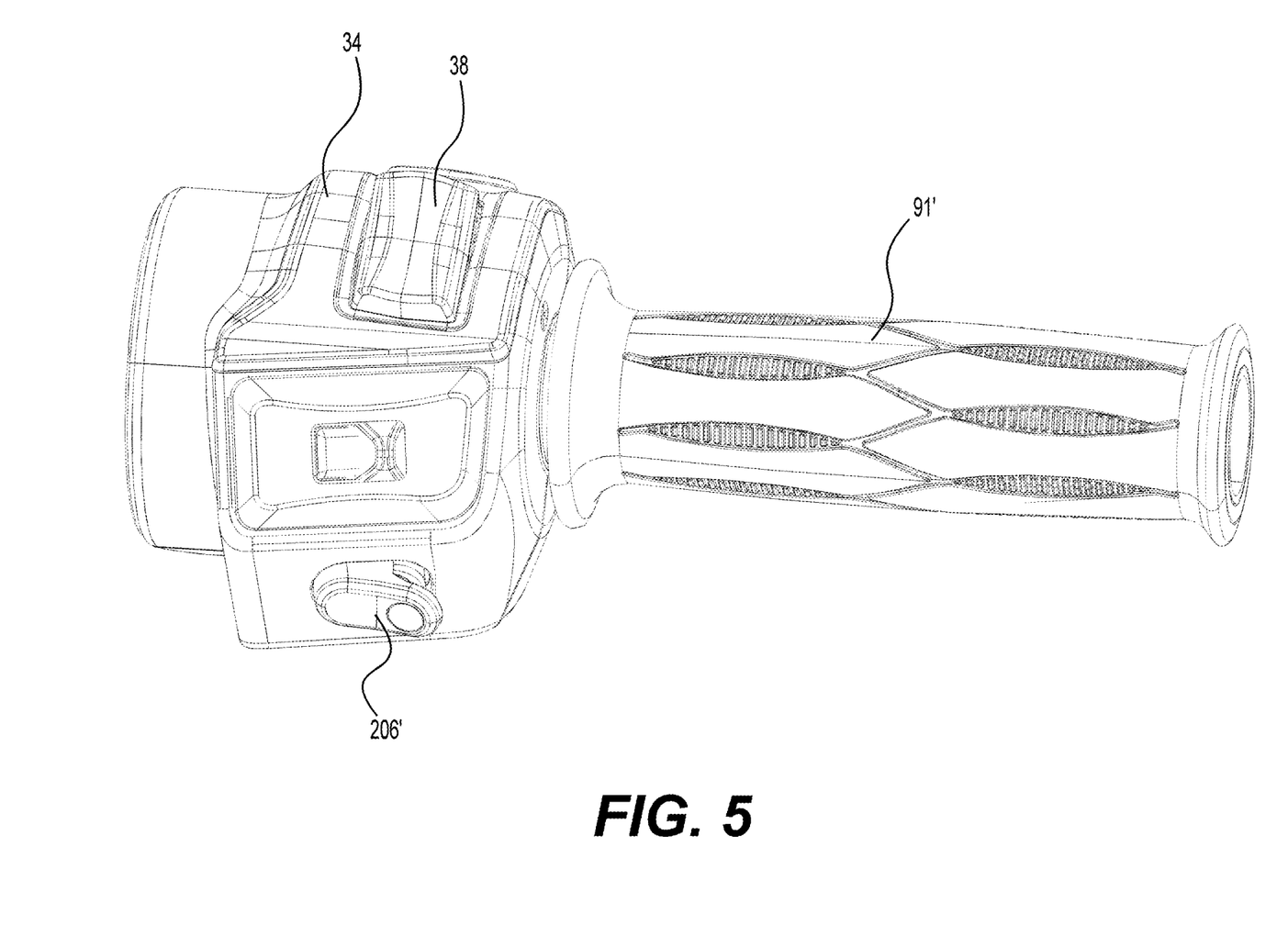
FIG. 5 is a perspective view taken from a rear, right side of a throttle operator and a switch assembly of the vehicle of FIG. 1 according to an alternative embodiment.

In an alternative embodiment shown in FIG. 5, the throttle operator is a twist grip 91' located next to the switch housing 34. Other types of throttle operators, such as a finger-actuated throttle lever and a pedal, are also contemplated. In the alternative embodiment shown in FIG. 5, the engine braking mode selector 206 is replaced by an engine braking mode selector 206' mounted to a rear of the switch housing 34. The engine braking mode selector 206' is a multi-position switch, with each position corresponding to one of the engine braking modes. It is contemplated that the braking mode selector 206 or 206' could be another type of input device. It is also contemplated that the braking mode selector 206 or 206' could be located elsewhere on the vehicle 10. For simplicity, a remainder of the description will be made with reference to the throttle lever 91 and the braking mode selector 206 shown in FIG. 4. It should be understood that the alternative embodiment illustrated in FIG. 5 and the other alternatives for the throttle operator and the braking mode selector described above could be used.

A throttle operator position sensor (TOPS) 85 (FIG. 3) is operatively connected to the throttle operator 91 to sense a position of the throttle operator 91. The TOPS 85 sends a signal representative of this position to an electronic control unit (ECU) 200 (FIG. 3) which, as will be described in greater detail below, controls operation of the engine 20.

A display cluster 125 is located forwardly of the handlebar 32 for displaying information to the driver.

An internal combustion engine 20 is mounted to the middle portion of the frame 12 and, as will be described in greater detail below, is operatively connected to the front and rear wheels 16, 18 in order to propel the ATV 10. In this embodiment, the engine 20 is a V-type engine having two cylinders. The cylinders are disposed at an angle to each other. Each cylinder has an intake port (not shown) connected to an air induction system delivering air into the engine 20. Each cylinder has a fuel injector injecting fuel into the engine 20 and a spark plug igniting the fuel-air mixture to initiate the combustion cycle. Each cylinder has an exhaust port connected to an exhaust manifold through which the exhaust gases are removed from the engine 20. It is contemplated that other types of internal combustion engines could be used, such as, for example, an inline engine. It is also contemplated that the engine 20 could have only one or more than two cylinders.

An air induction system of the engine 20 includes an intake manifold, a plenum chamber connected upstream of the intake manifold and a throttle body 68 (schematically shown in FIG. 3) connected upstream of the plenum chamber. When the engine 20 is operating, air flows sequentially through the throttle body 68, the plenum chamber, the intake manifold and then through the intake ports into the cylinders of the engine 20. The intake manifold separates the flow of air into multiple branches, each of the branches being connected to an air intake port of a corresponding cylinder of the engine 20.

Figure 3:
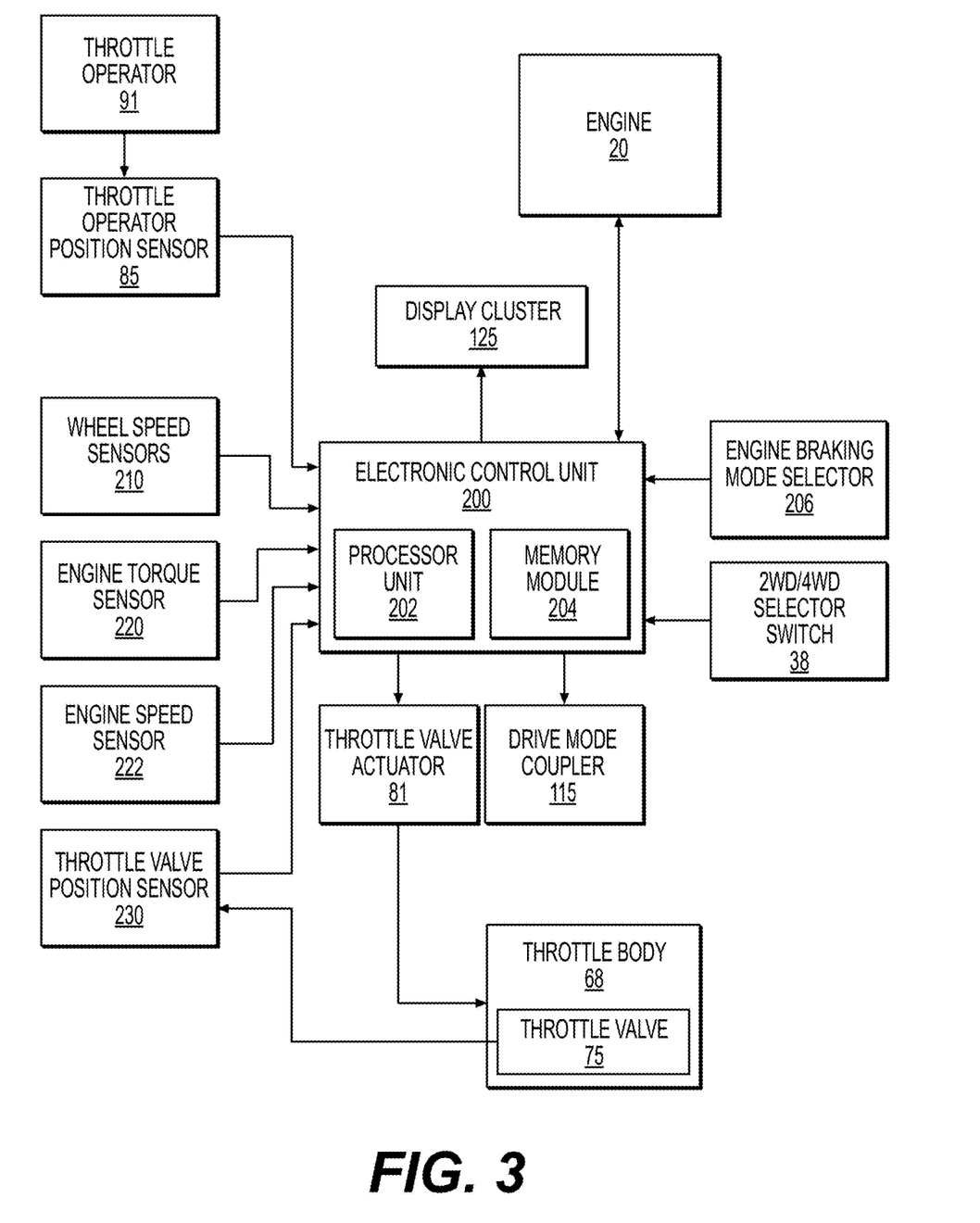
FIG. 3 is a schematic representation of various sensors and other components of the vehicle of FIG. 1.

The throttle body 68 regulates the flow of air to the engine 20. The throttle body 68 includes a throttle valve 75 (FIG. 3). Adjusting the position of the throttle valve 75 inside the throttle body 68 regulates air flow through the throttle body 68 to the engine 20. A throttle valve actuator 81 (e.g., an electric motor) is mounted to the throttle body 68 and is operatively connected to the throttle valve 75 to pivot the throttle valve 75 inside the throttle body 68, thereby changing a position of the throttle valve 75. The throttle valve 75 is pivotable between a closed position and a fully open position. The throttle valve 75 can also be pivoted to partially opened positions intermediate the closed and fully opened positions. The closed position of the throttle valve 75 is the position of the throttle valve 75 at which the flow of air through the throttle body 30 is most restricted. The fully open position of the throttle valve 75 is to position of the throttle valve 75 at which the flow of air through the throttle body 68 is least restricted. The angle of the throttle valve 75 at the closed and open positions could vary depending on the vehicle and the engine.

The throttle valve actuator 81 positions the throttle valve 75 based at least in part on the position of the throttle operator 91. Notably, as described above, the TOPS 85 senses a position of the throttle operator 91 and sends a signal representative of this position to the ECU 200. Based on this signal and other signals, the ECU 200 sends a signal to the throttle valve actuator 81 to adjust the position of the throttle valve 75 and thus an opening of the throttle body 68. A throttle valve position sensor 230 (FIG. 3) senses the position of the throttle valve 75 in the throttle body 68 and sends a throttle valve position signal representative of this position to the ECU 200.

Engine power, torque and engine speed are determined in part by the fuel-air mixture in the engine 20 and the ignition timing. The ECU 200 therefore regulates fuel injection into the engine 20 as well as the ignition timing by controlling operation of the fuel injectors and the spark plug or their equivalents.

Figure 2:
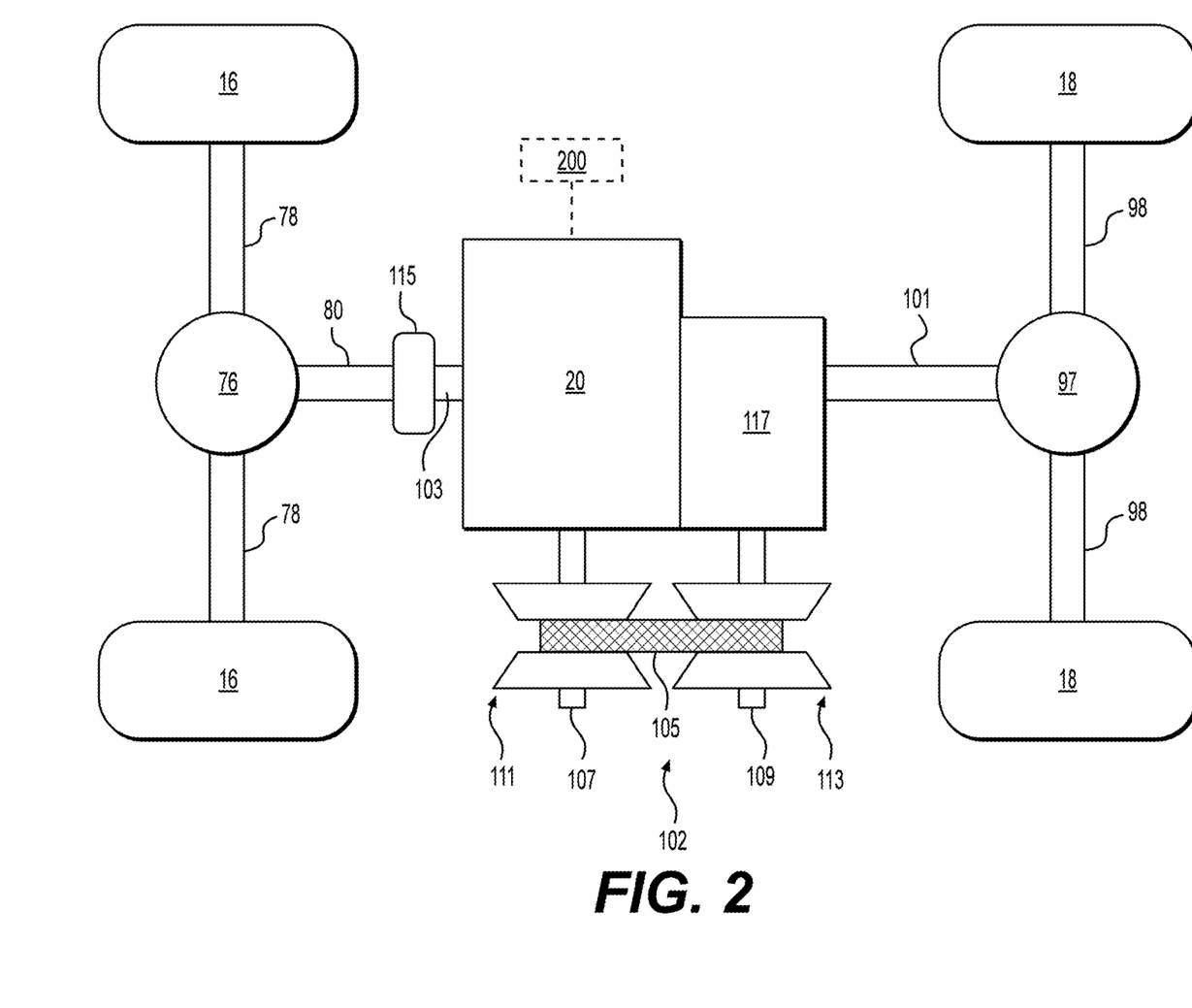
FIG. 2 is a schematic representation of a drivetrain of the vehicle of FIG. 1.

With reference to FIG. 2, a drivetrain of the ATV 10 includes the engine 20, a continuously variably transmission (CVT) 102 and a transmission 117. An output shaft 107 of the engine 20 is connected to the CVT 102 which, as will be described in greater detail below, is in turn connected to the transmission 117.

A gear selector handle (not shown) is configured to be selectively moved between positions P, N, R, L, H (respectively corresponding to a parking, neutral, reverse, low and high gears) and allows the driver of the ATV 10 to make a gear selection. It is contemplated that the sequence of gears could be different. The gear selector handle is connected to the transmission 117 for effecting the gear selection. The transmission 117 is disposed rearward of the engine 20. The transmission 117 transfers torque from a transversely extending driven shaft 109 to the longitudinally extending front and rear driveshafts (103, 101). The transmission 117 includes different gear sets, the combination of the gear sets being selected based on the position of the gear selector.

As shown in FIG. 2, the CVT 102 is disposed on a left side of the engine 20. The CVT 102 includes a drive pulley 111 disposed on the output shaft 107 of the engine 20, a driven pulley 113 disposed on the driven shaft 109 for rotation therewith, and a CVT belt 105 disposed around both pulleys 111, 113 to transmit torque from the drive pulley 111 to the driven pulley 113. A housing 106 (FIG. 1) of the CVT 102 is connected to both the engine 20 and the transmission 117. The driven shaft 109 is connected to the transmission 117 for transmitting thereto the torque output of the engine 20.

Each of the pulleys 111, 113 includes a movable sheave that can move axially relative to a fixed sheave to modify an effective diameter of the corresponding pulley 111, 113. The drive pulley 111 is a centrifugal pulley in that the sheaves thereof move in response to a centrifugal force applied thereon caused by changes in engine speed and torque requirement of the wheels 16, 18. The effective diameters of the pulleys 111, 113 are in inverse relationship. In the illustrated embodiment, the CVT 102 is a purely mechanical CVT 102, in which the effective diameter of the drive pulley 111 increases with increasing rotational speed of the drive pulley 111 (i.e. with increasing engine speed). The effective diameter of the driven pulley 113 therefore decreases when the torque required at the driven shaft 109 (connected to the wheels 16, 18) increases. The CVT 102 may thus be referred to as an "unassisted" CVT in that a gear ratio of the CVT 102 (i.e., an effective diameter of the driven pulley 113 over the effective diameter of the drive pulley 111) is automatically mechanically adjusted in accordance with the speed of the engine 20 and the torque requirement of the wheels 16, 18. It is contemplated that an "assisted" CVT, in which the effective diameter of at least one of the pulleys 111, 113 can be modified by an actuator independently of engine speed, could be used.

As shown in FIG. 2, the ATV 10 has a front differential 76 adapted to receive, via a driveshaft 80 a torque from the engine 20. On each of its left and right sides, the front differential 76 is connected to a half shaft 78. The front differential 76 transmits the torque to the front wheels 16 via the front half shafts 78. Depending on riding conditions, the front differential 76 may send unequal torque to the two front wheels 16 so that the left front wheel 16 and the right front wheel 16 may rotate at different speeds.

It is contemplated that, in some embodiments, the differential 76 could be a locking differential whereby the differential can be switched between a locked configuration and an open configuration. In the locked configuration, the wheels 16 are locked into the same rate of rotation and both wheels 16 receive the same amount of power. In the open configuration, the wheels 16 are allowed to freely rotate at different rates, similar to an open differential, for example for negotiating a turn.

The ATV 10 includes a rear spool gear assembly 97 driven by the rear driveshaft 101. The driveshaft 101 is driven by the transmission 117. On each of its left and right sides, the rear spool gear assembly 97 is connected to a half shaft 98. Another CV joint 145 is connected to an opposed end of each half shaft 98. The rear spool gear assembly 97 transmits the torque to the rear wheels 18 via the rear half shafts 98. Alternatively, in some embodiments, the torque from the engine 20 could be transmitted to the rear wheels 18 by an open differential, a limited slip differential, or a locking differential instead of by the rear spool gear assembly 97.

As described above, the ATV 10 can be operated in a two-wheel drive mode in which only the rear wheels 18 are driven by the engine 20 or in a four-wheel drive mode in which the front wheels 16 and the rear wheels 18 are driven by the engine 20 based on the position of the 2 WD/4 WD selector switch 38. To that end, in this embodiment, the transmission 117 is selectively connected to the front wheels 16 via a drive mode coupler 115, shown schematically in FIG. 2. As depicted in FIG. 3, the drive mode coupler 115 is controlled by the ECU 200 and is selectively actuated to cause the ATV 10 to change from the two-wheel drive mode configuration to the four-wheel drive mode configuration by selectively coupling the driveshaft 80 to the driveshaft 103 for selectively driving the front wheels 16. Such drive mode couplers are known in the art and will thus not be described in detail herein.

Therefore, when the ATV 10 is in the two-wheel drive mode, a torque output of the engine 20 is applied via the CVT 102 and the transmission 117 to the left and right rear wheels 18. Conversely, when the ATV 10 is in the four-wheel drive mode, a portion of the torque output of the engine 20 is applied to each of the front wheels 16 and rear wheels 18 via the CVT 102 and the transmission 117.

While the ATV 10 is described with the rear wheels 18 driving the vehicle when in the two-wheel drive mode, it is contemplated that the ATV 10 could implement a front wheel drive mode in other embodiments (i.e., in the two-wheel drive mode, the front wheels 16 are driven by the engine 20 rather than the rear wheels 18).

As shown in FIG. 3, the ECU 200 has a processor unit 202 for carrying out computer executable instructions, and a non-transitory memory module 204 that stores the computer executable instructions in a non-transitory medium (not shown) included in the memory module 204. The processor unit 202 includes one or more processors for performing processing operations that implement functionality of the ECU 200. The processor unit 202 may be a general-purpose processor or may be a specific-purpose processor comprising one or more preprogrammed hardware or firmware elements (e.g., application-specific integrated circuits (ASICs), electrically erasable programmable read-only memories (EEPROMs), etc.) or other related elements. The non-transitory medium of the memory module 204 may be a semiconductor memory (e.g., read-only memory (ROM) and/or random-access memory (RAM)), a magnetic storage medium, an optical storage medium, and/or any other suitable type of memory. While the ECU 200 is represented as being one entity in this implementation, it is understood that the ECU 200 could comprise separate entities for controlling components separately.

The ECU 200 is in communication with a plurality of sensors of the ATV 10 in order to control operation of the ATV 10. For instance, as shown in FIG. 3, the ECU 200 is in communication with, amongst other sensors, the throttle operator position sensor 85, wheel speed sensors 210 for sensing rotational speeds representative of the rotational speeds of the front wheels 16 and the rear wheels 18, an engine torque sensor 220 to sense a torque output of the engine 20, the throttle valve position sensor 230, and an engine speed sensor 222 sensing a speed of rotation of the crankshaft of the engine 20 or the speed of rotation of the output shaft 107. Other sensors are also contemplated.

In this embodiment, the rotational speeds representative of the rotational speeds of the front and rear wheels 16, 18 that are sensed by the wheel speed sensors 210 are the rotational speeds of the front and rear wheels 16, 18. In other embodiments, the rotational speeds representative of the rotational speeds of the front and rear wheels 16, 18 could be the rotational speeds of the wheels 16, 18, or the rotational speeds of shafts connected to the wheels 16, 18, or the rotational speeds of the driven pulley 113 connected to the wheels 16, 18, or any other speeds from which the rotational speeds of the wheels 16, 18 could be inferred. In the present embodiment, the wheel speed sensors 210 are used as vehicle speed sensors. As the diameter of the wheels 16, 18 is known, the signal sent from the wheel speed sensors 210 to the ECU 200 is indicative of the speed of the vehicle 10 and is used by the ECU 200 to determine the speed of the vehicle 10. In alternative embodiments, the vehicle speed sensor can be a global positioning system that can determine the distance travelled over time to provide a signal indicative of the speed of the vehicle 10 to the ECU 200. In other alternative embodiments, by determining the transmission ratio between the engine 20 and the wheels 16, 18, the engine speed sensor 222 can be used as the vehicle speed sensor.

The torque output of the engine 20 is measured by an engine torque sensor 220 communicating with the ECU 200 to send a signal representative of engine torque to the ECU 200. Alternatively, the engine torque sensor 220 can be omitted, and the torque output of the engine 20 can be calculated by the ECU 200 or obtained from control maps by the ECU 200 based on the rotational speed output of the engine 20, fuel injection into the cylinders thereof and the ignition timing of the engine 20.

The ATV 10 includes other components such as an exhaust system, radiators, headlights, and the like. As it is believed that these components would be readily recognized by one of ordinary skill in the art, further explanation and description of these components will not be provided herein.

Figure 6:
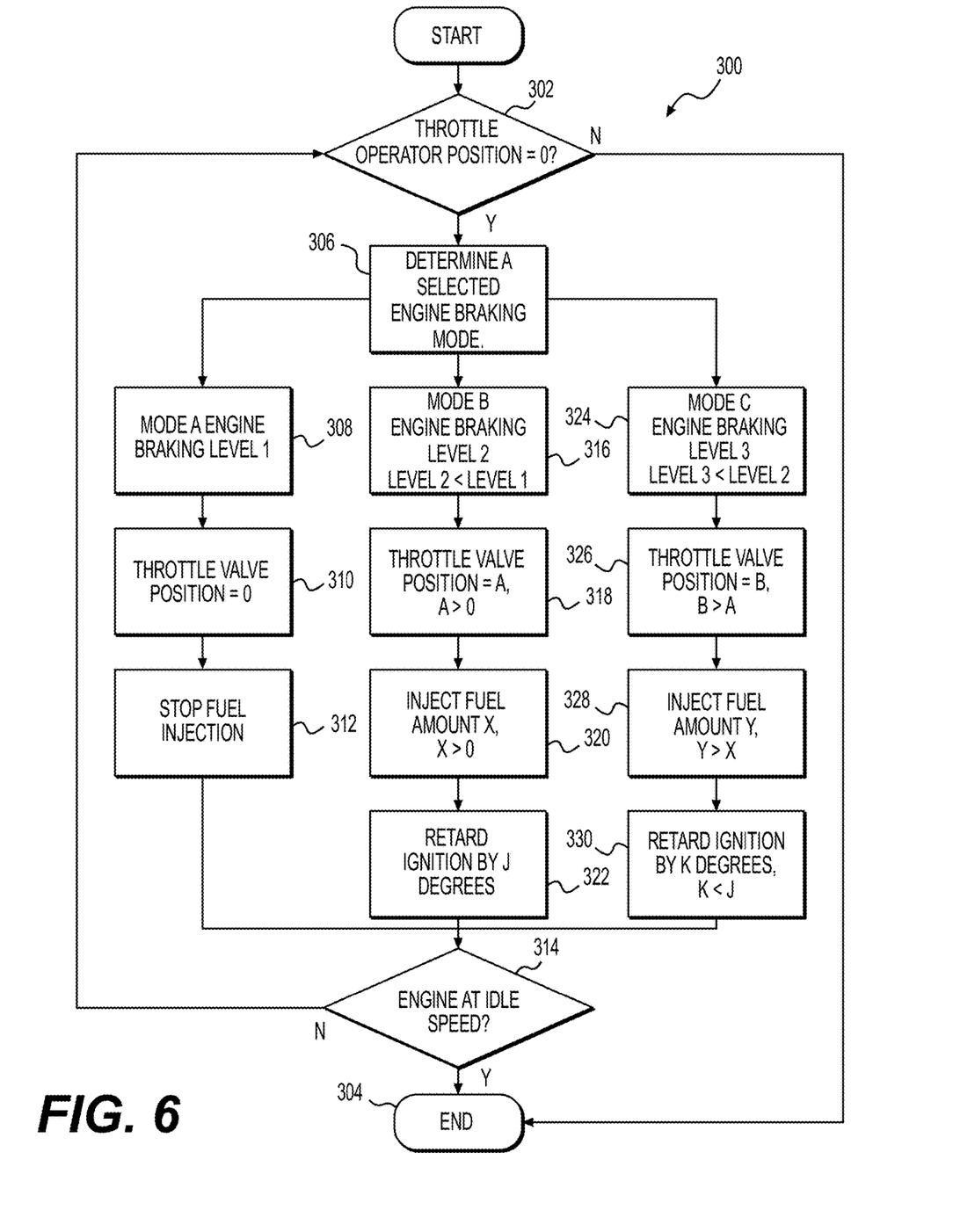
FIG. 6 is a flowchart illustrating an embodiment of a method for controlling engine braking in the vehicle of FIG. 1.

Turning now to FIG. 6, a method 300 for controlling engine braking in the vehicle 10 will be described. The computer executable instructions required for the ECU 200 to execute the method 300 are stored in the memory of the ECU 200.

The method 300 allows a driver of the vehicle 10 to select a desired level of engine braking provided by the engine 20 when the driver fully releases the throttle operator 91. To select the desired engine braking mode, the driver actuates the engine braking mode selector 206 until the desired engine braking mode is selected. The currently selected engine braking mode is displayed on the display cluster 125.

In the present embodiment, the driver can select between three different engine braking modes (i.e. Mode A, Mode B, Mode C). Mode A provides the greatest level of engine braking, that is to say that under mode A, the engine 200 will provide the most engine braking of the three modes and the deceleration of the vehicle 10 due to engine braking will be the greatest. Mode B provides a level of engine braking that is smaller than in mode A. Under mode B, the engine 200 will provide less engine braking than in mode A. Mode C provides the least level of engine braking. Under mode C, the engine 200 will provide less engine braking than in mode A and mode B. It is contemplated that in alternative embodiments the drivers could select between only two or more than three engine braking modes.

It is contemplated that in alternative embodiments, the vehicle 10 could be provided with a driving mode selector allowing the driver to select between different driving modes such as a "trail mode", a "comfort mode" and a "sport mode" for example. The different driving modes may have different engine acceleration and suspension adjustments for example. In such embodiments, the different driving modes have different associated engine braking modes. As such, by selecting a driving mode, the user also selects an engine braking mode associated with the driving mode. Therefore, in such embodiments, since the driving mode selector also selects an engine braking mode associated with the selected driving mode, the driving mode selector is considered to correspond to an engine braking mode selector.

At 302, the ECU 200 determines if the throttle operator 91 is its fully released position based on the signal received from the TOPS 85. In the present embodiment, the throttle operator 91 is normally biased toward its fully released position. As such, when the driver lets go of the throttle operator 91, the throttle operator 91 automatically moves to its fully released position. If at 302 the throttle operator 91 is not at its fully released position, then at 304 the ECU 200 continues normal control the engine 20 and the position of the throttle valve 75 (i.e. without controlling the engine 20 and the position of the throttle valve 75 according to one of the engine braking modes). If at 302 the throttle operator 91 is at its fully released position, then the ECU 200 proceeds to 306. At 306, the ECU 200 determines which one of the three engine braking modes has been selected using the engine braking mode selector 206.

If at 306, the selected engine braking mode is mode A, then at 308 the ECU 200 controls the engine 20 and the position of the throttle valve 75 according to mode A to apply the greatest level of engine braking of the three modes. Controlling the engine 20 and the position of the throttle valve 75 according to mode A includes closing the throttle valve 75 (i.e. moving it to its closed position) at 310 and stopping to inject fuel at 312. It is contemplated that 312 could be performed before 310 or that 310 and 312 could be performed simultaneously. As a result, the engine 20 causes engine braking which slows down the vehicle 10. As can be seen with reference to the Mode A line in FIG. 7 (i.e. the dashed-dot line), the resulting engine torque is a negative engine torque which increases as the speed of the vehicle 10 decreases. The slope and shape of the Mode A line will depend on the construction of the engine 20 and its associated components. The engine braking mode A corresponds to the type of engine braking that typically occurs in vehicles. It is contemplated that in some embodiments, at 310 the throttle valve 75 could be slightly opened and/or at 312 there could be a small amount of fuel injection. For example, it is contemplated that at 310, the throttle valve 75 could be opened by about 2 or 3 percent.

Figure 7:
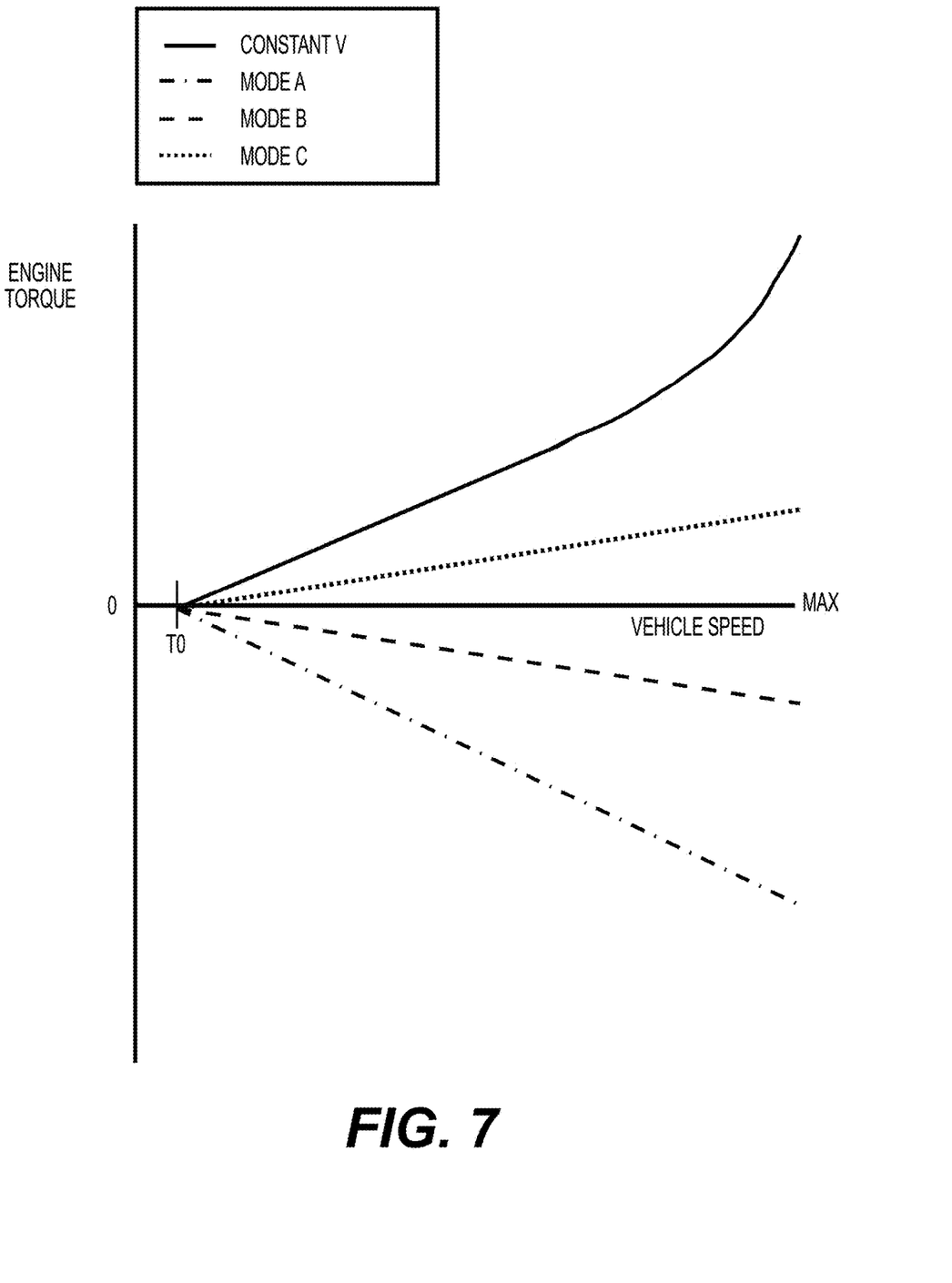
FIG. 7 is a graph illustrating engine torque relative to vehicle speed for various modes of operations of the vehicle of FIG. 1.

As can be seen in FIG. 7, an engine torque of zero is reached at point T0 before the vehicle 10 reaches a speed of zero. This is because when the vehicle 10 reaches the speed corresponding to point T0, the centrifugal drive pulley 111 of the CVT 102 does not turn fast enough to clamp the belt 105 and as a result the drive pulley 111 turns relative to the belt 105. It is contemplated that in embodiments having an assisted CVT 102, the belt 105 could be clamped at lower speeds of rotation of the drive pulley 111 such that engine braking could be applied until the vehicle 10 stops.

From 312, the ECU 200 proceeds to 314. At 314 the ECU 200 determines an engine speed of the engine 20 based on the signal received from the engine speed sensor 222. If at 314 the engine 20 has not reached its idle speed, then the ECU 302 returns to 302. If at 314 the engine 20 has reached its idle speed, then the ECU 200 stops controlling the engine 20 and the position of the throttle valve 75 according to the selected engine braking mode (mode A in this case) and proceeds to 304 where the engine 20 and the position of the throttle valve 75 will be controlled to maintain the engine 20 at idle speed until the throttle operator 91 is actuated.

Returning to 306, if the selected engine braking mode is mode B, then at 316 the ECU 200 controls the engine 20 and the position of the throttle valve 75 according to mode B to apply a level of engine braking that is less than the level of engine braking of mode A. Controlling the engine 20 and the position of the throttle valve 75 according to mode B includes moving the throttle valve 75 to a partially open position A at 318, injecting a fuel amount X at 320 and retarding ignition by J degrees at 322. It is contemplated that 318, 320 and 322 could be performed in a different order and/or that two or more of 318, 320, 322 could be performed simultaneously. To obtain the position A of the throttle valve 75, the fuel amount X and the number of degrees J, the ECU 200 first determines the speed of the vehicle 10. The ECU 200 then determines values of A, X and J that will result in the engine 20 producing an engine torque corresponding to the engine torque on the Mode B line in FIG. 7 (i.e. the dashed line) for this speed of the vehicle 10. As manners in which throttle valve position, fuel injection and ignition can be controlled to obtain a target torque are known, this will not be described in detail herein. As can be seen with reference to the Mode B line in FIG. 7, the engine torque in mode B is a negative engine torque which increases as the speed of the vehicle 10 decreases. As in mode A, in mode B an engine torque of zero is reached at point T0 before the vehicle 10 reaches a speed of zero for the same reasons as those explained above. The slope and shape of the Mode B line could be different than illustrated. As can be seen by comparing the Mode B line to the Mode A line in FIG. 7, for any given speed of the vehicle 10 above the speed at T0 the engine torque is smaller in mode A than in mode B, as such for any given speed of the vehicle 10 above the speed at T0 the level of engine braking in greater in mode A than in mode B. It is contemplated that in embodiments where the throttle valve 75 is kept slightly opened at 310 in mode A, the position A of the throttle valve 75 could be the same as the slightly opened position at 310 in mode A. From 322, the ECU 200 proceeds to 314 which is then performed as described above.

Returning once again to 306, if the selected engine braking mode is mode C, then at 324 the ECU 200 controls the engine 20 and the position of the throttle valve 75 according to mode C to apply a level of engine braking that is less than the level of engine braking of modes A and B. Controlling the engine 20 and the position of the throttle valve 75 according to mode C includes moving the throttle valve 75 to a partially open position B at 326, injecting a fuel amount Y at 328 and retarding ignition by K degrees at 330. It is contemplated that 326, 328 and 330 could be performed in a different order and/or that two or more of 326, 328, 330 could be performed simultaneously. To obtain the position B of the throttle valve 75, the fuel amount Y and the number of degrees K, the ECU 200 first determines the speed of the vehicle 10. The ECU 200 then determines values of B, Y and K that will result in the engine 20 producing an engine torque corresponding to the engine torque on the Mode C line in FIG. 7 (i.e. the dotted line) for this speed of the vehicle 10. As manners in which throttle valve position, fuel injection and ignition can be controlled to obtain a target torque are known, this will not be described in detail herein. As can be seen with reference to the Mode C line in FIG. 7, the engine torque in mode C is a positive engine torque which decreases as the speed of the vehicle 10 decreases. The positive engine torque is less than an engine torque needed to maintain the vehicle at its current vehicle speed, which is illustrated by the solid line Constant V in FIG. 7, as such engine braking occurs and the vehicle 10 decelerates. As in modes A and B, in mode C an engine torque of zero is reached at point T0 before the vehicle 10 reaches a speed of zero for the same reasons as those explained above. The slope and shape of the Mode C line could be different than illustrated. As can be seen by comparing the Mode C line to the Mode B line in FIG. 7, for any given speed of the vehicle 10 above the speed at T0 the engine torque is smaller in mode B than in mode C, as such for any given speed of the vehicle 10 above the speed at T0 the level of engine braking in greater in mode B than in mode C. In order to achieve the greater engine torques in mode C compared to mode B, for any given speed of the vehicle 10 above the speed at T0, the throttle valve 75 is more open in position B than in position A, the fuel amount Y is greater than the fuel amount X, and the number of degrees K is less than the number of degrees J. It is contemplated that in some embodiments, the position B of the throttle valve 75 could be the same as the position A. From 330, the ECU 200 proceeds to 314 which is then performed as described above.

It is contemplated that the manner in which the engine 20 and the position of the throttle valve 75 are controlled according to the engine braking mode B or C could differ from the one described above. For example, it is contemplated that 322 and 330 could be omitted. In another example, fuel injection and ignition could be disabled in one of the two cylinders such that fuel injection and ignition would be controlled in only one of the cylinders.

When the ECU 200 arrives at 306 from 314 via 302, should the selected engine braking mode have changed, the ECU 200 will control the engine 20 and the position of the throttle valve 75 to control the engine torque in order to smoothly transition from the engine torque corresponding to the previously selected engine braking mode to the engine torque corresponding to the newly selected engine braking mode. It is also contemplated that once 306 has been performed once, the engine braking mode could not be changed until the method ends at 304 and then starts again at 302 even if the engine braking mode selector 206 is actuated while the method 300 is performed. In an alternative embodiment, 306 could be performed before 302 and 314 would still return to 302. As a result, the engine braking mode could not be changed while the method 300 is being performed.

It is contemplated that in an alternative embodiment of the method 300, the ECU 200 could control the engine 20 and the position of the throttle valve 75 to obtain a desired deceleration of the vehicle 10 instead of a desired engine torque as described above, with each engine braking mode corresponding to a different deceleration profile. The deceleration of the vehicle 10 can be determined from the change in the speed of the vehicle 10 over time or by an accelerometer provided on the vehicle 10.

Modifications and improvements to the above-described embodiments of the present technology may become apparent to those skilled in the art. The foregoing description is intended to be exemplary rather than limiting. The scope of the present technology is therefore intended to be limited solely by the scope of the appended claims.

What is claimed is:

1. A vehicle comprising:
    an internal combustion engine;
    at least one ground engaging member, at least one of the at least one ground engaging member being operatively connected to the internal combustion engine for propelling the vehicle;
    a throttle body fluidly connected to the internal combustion engine, the throttle body having a throttle valve for controlling a flow of air to the internal combustion engine;
    a throttle valve actuator operatively connected to the throttle valve for changing a position of the throttle valve;
    an electronic control unit (ECU) communicating with the internal combustion engine for controlling the internal combustion engine and with the throttle valve actuator for controlling the position of the throttle valve;
    a throttle operator;
    a throttle operator position sensor (TOPS) for sensing a position of the throttle operator and communicating with the ECU for sending a signal indicative of the position of the throttle operator;
    a vehicle speed sensor communicating with the ECU for sending a signal indicative of a speed of the vehicle to the ECU;
    an engine braking mode selector communicating with the ECU,
    the ECU having a memory storing computer executable instructions, in response to the instructions being executed, the ECU:
        determining the position of the throttle operator;
        determining the speed of the vehicle;
        determining the engine braking mode selected from a plurality of engine braking modes by the engine braking mode selector, the plurality of engine braking modes comprising a first engine braking mode and a second engine braking mode;
        in response to the position of the throttle operator being a fully released position and the selected braking mode being the first engine braking mode:
            controlling the internal combustion engine and the position of the throttle valve according to the first engine braking mode for applying a first level of engine braking;
        in response to the position of the throttle operator being the fully released position and the selected braking mode being the second engine braking mode:
            controlling the internal combustion engine and the position of the throttle valve according to the second engine braking mode to obtain a target engine torque based at least on the speed of the vehicle for applying a second level of engine braking,
        for any given speed of the vehicle above a predetermined speed of the vehicle, the first level of engine braking being greater than the second level of engine braking; and
        stopping to control the internal combustion engine and the position of the throttle valve according to the engine braking mode selected from the plurality of engine braking modes in response to the position of the throttle operator being any position other than the fully released position.

2. The vehicle of claim 1, wherein controlling the internal combustion engine and the position of the throttle valve according to the first engine braking mode comprises closing the throttle valve and stopping fuel injection.

3. The vehicle of claim 1, wherein controlling the internal combustion engine and the position of the throttle valve according to the second engine braking mode comprises moving the throttle valve to a partially open position and injecting fuel.

4. The vehicle of claim 3, wherein controlling the internal combustion engine and the position of the throttle valve according to the second engine braking mode further comprises retarding ignition.

5. The vehicle of claim 1, wherein:
    the target engine torque is a first target engine torque;
    the plurality of engine braking modes further comprises a third engine braking mode;
    in response to the instructions being executed, the ECU controls the internal combustion engine and the position of the throttle valve according to the third engine braking mode to obtain a second target engine torque based at least on the speed of the vehicle for applying a third level of engine braking in response to the position of the throttle operator being the fully released position and the selected braking mode being the third engine braking mode; and for any given speed of the vehicle above the predetermined speed of the vehicle, the second level of engine braking is greater than the third level of engine braking.

6. The vehicle of claim 5, wherein:
controlling the internal combustion engine and the position of the throttle valve according to the second engine braking mode comprises moving the throttle valve to a first partially open position;
controlling the internal combustion engine and the position of the throttle valve according to the third engine braking mode comprises moving the throttle valve to a second partially open position; and
for any given speed of the vehicle above the predetermined speed of the vehicle, the throttle valve is equally open or more open in the second partially open position than in the first partially open position.

7. The vehicle of claim 5, wherein:
controlling the internal combustion engine and the position of the throttle valve according to the second engine braking mode comprises injecting a first amount of fuel;
controlling the internal combustion engine and the position of the throttle valve according to the third engine braking mode comprises injecting a second amount of fuel; and
for any given speed of the vehicle above the predetermined speed of the vehicle, the second amount of fuel is greater than the first amount of fuel.

8. The vehicle of claim 5, wherein:
controlling the internal combustion engine and the position of the throttle valve according to the second engine braking mode comprises retarding ignition by a first number of degrees;
controlling the internal combustion engine and the position of the throttle valve according to the third engine braking mode comprises retarding ignition by a second number of degrees; and
for any given speed of the vehicle above the predetermined speed of the vehicle, the second number of degrees is less than the first number of degrees.

9. The vehicle of claim 5, wherein:
the first target engine torque is a negative engine torque that increases as the speed of the vehicle decreases; and
the second target engine torque is a positive engine torque that decreases as the speed of the vehicle decreases.

10. The vehicle of claim 1, wherein in response to the instructions being executed, the ECU:
determines an engine speed; and
stops controlling the internal combustion engine and the position of the throttle valve according to the engine braking mode selected from the plurality of engine braking modes in response to the engine speed being an idle speed of the internal combustion engine.

11. The vehicle of claim 1, further comprising a continuously variable transmission operatively connecting the internal combustion engine to the at least one of the at least one ground engaging member.

12. The vehicle of claim 1, further comprising a steering device operatively connected to at least one of the at least one ground engaging member for steering the vehicle; and
wherein the engine braking mode selector is mounted to the steering device.

13. The vehicle of claim 12, wherein the steering device is a handlebar.

14. The vehicle of claim 13, wherein:
the throttle operator is mounted to the handlebar; and
the engine braking mode selector is in proximity to the throttle operator.

15. The vehicle of claim 1, wherein the throttle operator is one of:
a throttle lever; and
a twist grip.

16. The vehicle of claim 1, wherein the at least one ground engaging member is at least one wheel.

17. The vehicle of claim 16, wherein:
the at least one wheel is four wheels; and
the internal combustion engine is operatively connected to the four wheels for propelling the vehicle.

18. The vehicle of claim 1, wherein the target engine torque is a negative engine torque that increases as the speed of the vehicle decreases.

19. The vehicle of claim 1, wherein the target engine torque is a positive engine torque that decreases as the speed of the vehicle decreases.

20. A method for controlling engine braking in a vehicle comprising:
determining a position of a throttle operator of the vehicle;
determining a speed of the vehicle;
determining an engine braking mode selected from a plurality of engine braking modes, the plurality of engine braking modes comprising a first engine braking mode and a second engine braking mode;
in response to the position of the throttle operator being a fully released position and the selected braking mode being the first engine braking mode:
controlling an internal combustion engine of the vehicle and a position of a throttle valve of the vehicle according to the first engine braking mode for applying a first level of engine braking;
in response to the position of the throttle operator being the fully released position and the selected braking mode being the second engine braking mode:
controlling the internal combustion engine and the position of the throttle valve according to the second engine braking mode to obtain a target engine torque based at least on the speed of the vehicle for applying a second level of engine braking,
for any given speed of the vehicle above a predetermined speed of the vehicle, the first level of engine braking being greater than the second level of engine braking; and
stopping to control the internal combustion engine and the position of the throttle valve according to the engine braking mode selected from the plurality of engine braking modes in response to the position of the throttle operator being any position other than the fully released position.

21. The method of claim 20, wherein controlling the internal combustion engine and the position of the throttle valve according to the first engine braking mode comprises closing the throttle valve and stopping fuel injection.

22. The method of claim 20, wherein controlling the internal combustion engine and the position of the throttle valve according to the second engine braking mode comprises moving the throttle valve to a partially open position and injecting fuel.

23. The method of claim 20, wherein the target engine torque is a negative engine torque that increases as the speed of the vehicle decreases.

24. The method of claim 20, wherein the target engine torque is a positive engine torque that decreases as the speed of the vehicle decreases.

\* \* \* \* \*